United States Patent [19]
Eckstein

[11] 3,749,242
[45] July 31, 1973

[54] DEVICE FOR SORTING IMPROPER LENGTHS OF ARTICLES

[75] Inventor: George R. Eckstein, Fairfield, Conn.

[73] Assignee: Remington Arms Company, Inc., Bridgeport, Conn.

[22] Filed: May 19, 1972

[21] Appl. No.: 255,029

[52] U.S. Cl. .................................. 209/123, 209/82
[51] Int. Cl. .............................................. B07c 5/06
[58] Field of Search .................. 209/73, 78, 80, 82, 209/93, 123, 91

[56] References Cited
UNITED STATES PATENTS
2,716,487   8/1955   Cox ...................................... 209/91
3,313,410   4/1967   Gardner ............................. 209/91 X Primary Examiner—Richard A. Schacher
Attorney—John H. Lewis, Jr. et al.

[57] ABSTRACT

A device for sorting out improper length articles — either too long or too short — from a mass of articles. The articles to be processed are passed by gravity means in an end-to-end manner through an accurately spaced curved channel which causes fixed width gaps to be located at fixed distances between elongated articles when the articles are uniform length. A star wheel is designed to mesh into the gaps and is driven by a plurality of projections registering much the same as a sprocket driven by a chain. Articles which are either too short or too long will not permit the star wheel to mesh and thus the wheel becomes jammed and the gravity fed line of articles is stopped. Means are provided to permit pivotal movement of the curved channel to an inoperative position to permit easy removal of the improper length article.

9 Claims, 5 Drawing Figures

DEVICE FOR SORTING IMPROPER LENGTHS OF ARTICLES

This invention relates to means for segregating articles of improper length from articles of proper length. More specifically, the invention relates to apparatus which segregates elongated articles which may be either longer or shorter than a predetermined desired length.

In general, the invention relates to apparatus for sorting articles, blanks, or slugs intended to be used in a process where the process depends upon uniform length of articles, blanks, or slugs for smooth operations, avoiding tool smashups, jams, etc. The apparatus of the present invention comprises means whereby the articles, etc., from a mass of articles are conducted to a sorting device where the articles which are outside a predeteremined range of lengths (either greater or lesser than a predetermined length) stop the normal flow of articles and may be removed manually while the articles within the prescribed range of lengths are passed through the sorting device for a further manufacturing operation.

There are various prior art devices which are designed to remove improper lengths of blanks, etc. Some remove only short lengths while others are designed to remove articles having an excessive length. There are other devices which rely on photo-electric means or other elaborate electronic equipment to indicate the presence of an improper length article and to initiate automatic means to remove the defective article from the line.

The present device is a low-cost system developed where the number of improper length articles is not expected to be great enough to justify the expense of designing and constructing a fully automatic system. The present device is so designed that the flow of articles is stopped when an improper length article is encountered thus necessitating the manual removal of the offending article before the flow of articles can be resumed.

It is an object of this invention to provide a low-cost, mechanical device to sort out improper lengths of articles from a mass of articles.

Another object is to provide a simple device wherein improper lengths of articles are sorted out of a mass of articles by passing the articles over an accurately spaced curved channel onto accurately spaced projections on a free turning rotor wherein proper length articles will turn the rotor while improper length articles — either long or short articles — will jam the rotor and prevent passing of the article past the rotor.

Still another object of the invention is to provide adjustable means whereby the device can be readjusted to fit changed standard length of articles.

Still another object of the invention is to provide means for swinging the sorting device to an inoperative position to permit easy removal of both long and short articles which will not clear the sorting device.

Other objects and advantages will be apparent after reading the appended claims and the following description in which:

Figure 1:
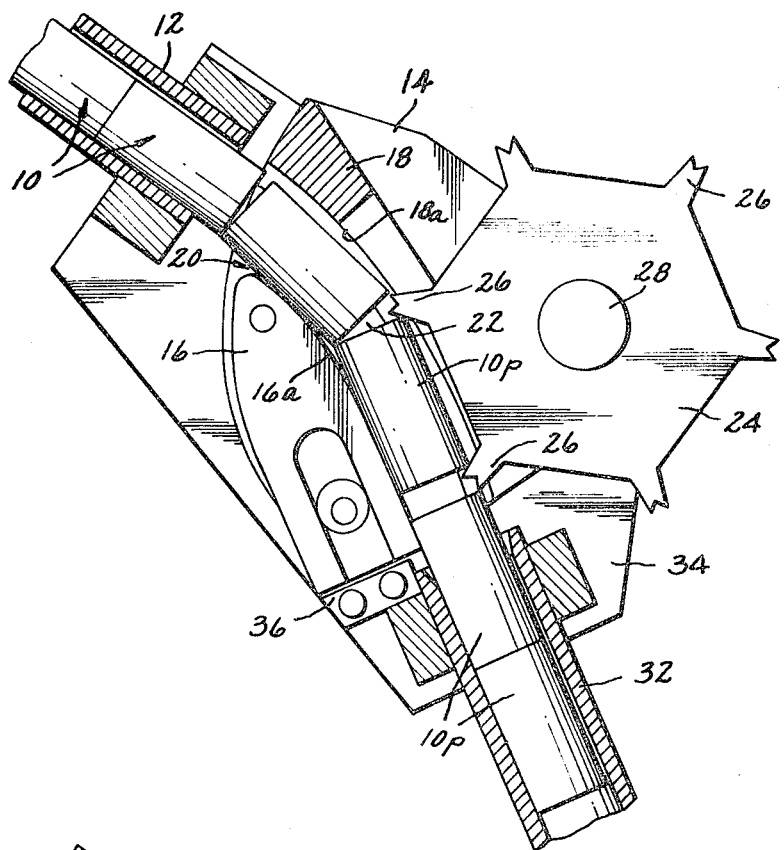
FIG. 1 is a side elevational view of the slug sorting apparatus with a proper length slug between the projections of the star wheel.

Referring to FIG. 1 it can be seen that a plurality of slugs 10 are being fed by gravity through a feed pipe 12 in an end-to-end manner. Mounted above feed pipe 12 but not shown in the drawings is a conventional hopper with any well-known means to have the slugs enter into feed pipe 12 in an end-to-end manner. In order to facilitate understanding of the invention 10p will refer to proper length slugs, 10s will refer to a small slug, and 10l will refer to a long slug. Slugs 10s and 10l will be outside established tolerances and will be generally referred to as improper length slugs or articles.

Located beneath the discharge end of feed pipe 12 is a plate member 14 on which a lower guide block 16 and an upper retaining block 18 are mounted. Lower guide block 16 has a convex curved surface 16a which co-operates with a complementary curved surface 18a on upper retaining block 18 to form a curved channel means 20 into which the slugs are passed from the feed pipe 12.

It can be seen from FIG. 1 that when uniform length slugs 10p are passed over the convex curved surface 16a there are fixed width gaps 22 located at fixed distances between successive slugs.

Figure 5:
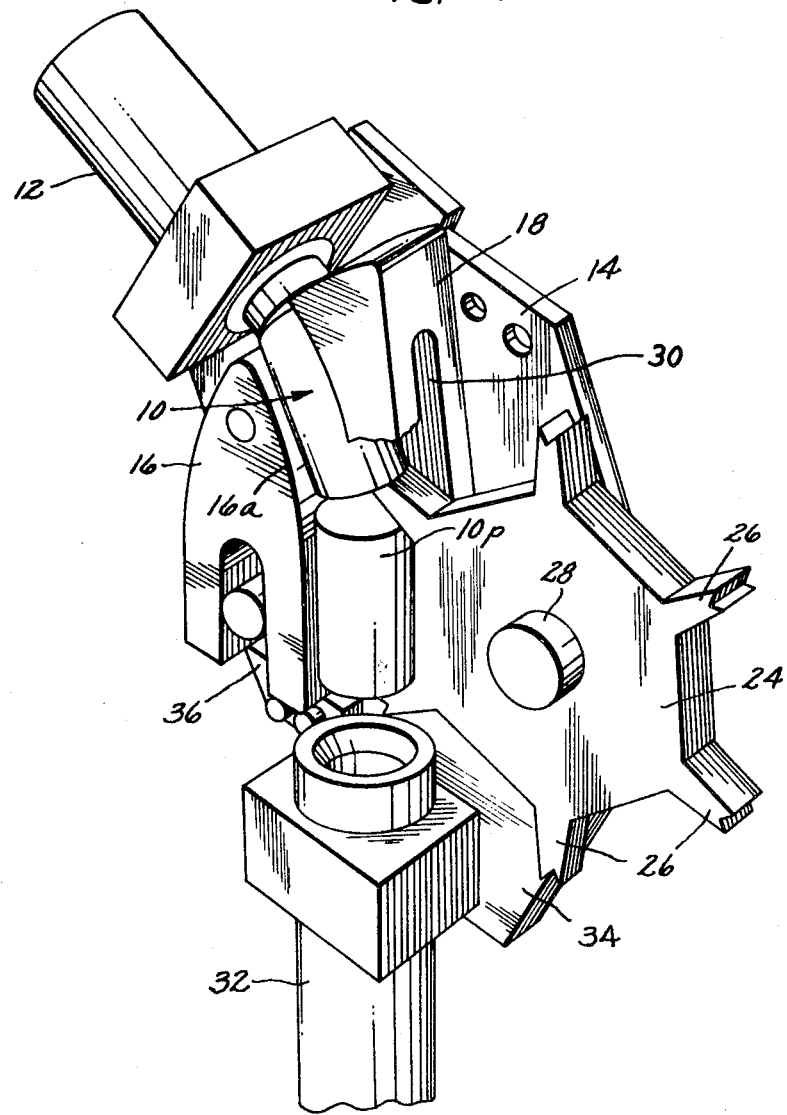
FIG. 5 is an isometric view of the apparatus with parts cut away to show the relationship of the star wheel and the guide blocks.

A rotor 24, e.g. a star wheel, having a plurality of accurately spaced, outwardly extending projections or teeth 26, is rotatably mounted at 28 on needle bearings or other means so as to be free turning. The rotor is so positioned that its projections 26 move through a slot 30 (FIG. 5) in upper retaining block 18 to mesh neatly into gaps 22. The distance between projections 26, the radius of convex guide surface 16a and the positioning of the projections as related to the guide surface 16a determine the range of established tolerances of article length which will successfully pass through the sorting device as acceptable product.

Upon passing through the channel means 20 past the rotor or star wheel 24, the proper length slugs 10p pass end-to-end into exit pipe 32 to be fed to machinery (not shown) for further processing or for whatever use is to be made of the proper size slugs.

Again, referring to FIG. 1, it can be seen that when the radius of guide surface 16a is right and the distance between the guide surface 16a and star wheel 24 is correct, the correct length slugs 10p barely touch two projections 26 of the star wheel 24 simultaneously while resting on the curved guide surface 16a. The slugs 10p fall through the apparatus turning the star wheel by their own weight.

Figure 2:
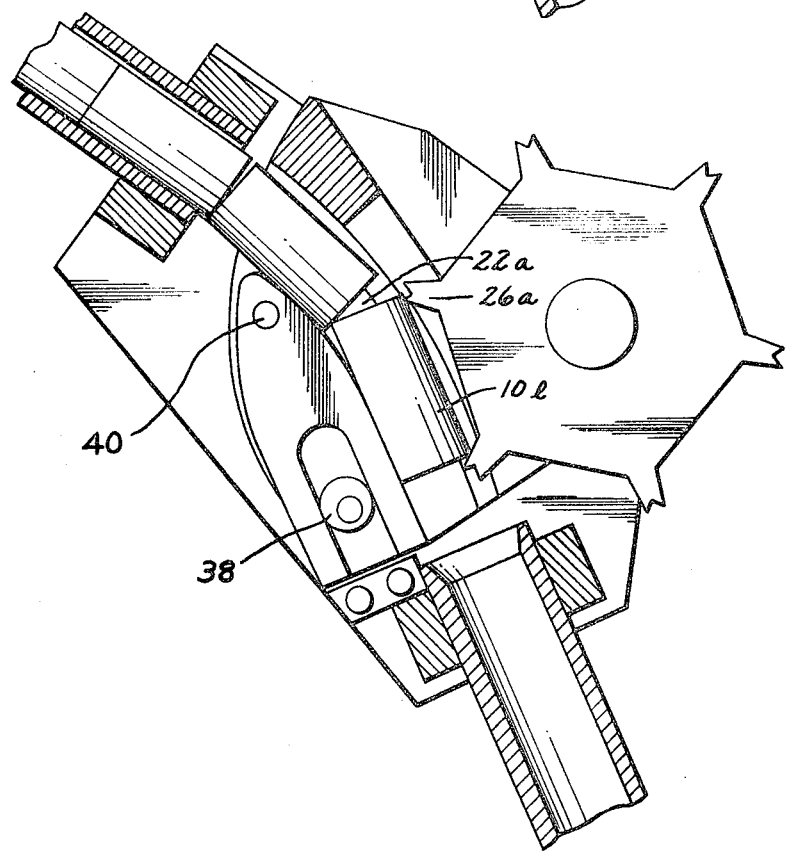
FIG. 2 is a side elevational view of the apparatus showing the star wheel jammed because of an improper long slug.

FIG. 2 shows the stoppage of a long slug 10l. It can be seen that the length of the slug 10l is too long for projection 26a to mesh into the gap 22a and thus slug 10l cannot slide freely along the curved guide surface and jamming occurs.

Figure 3:
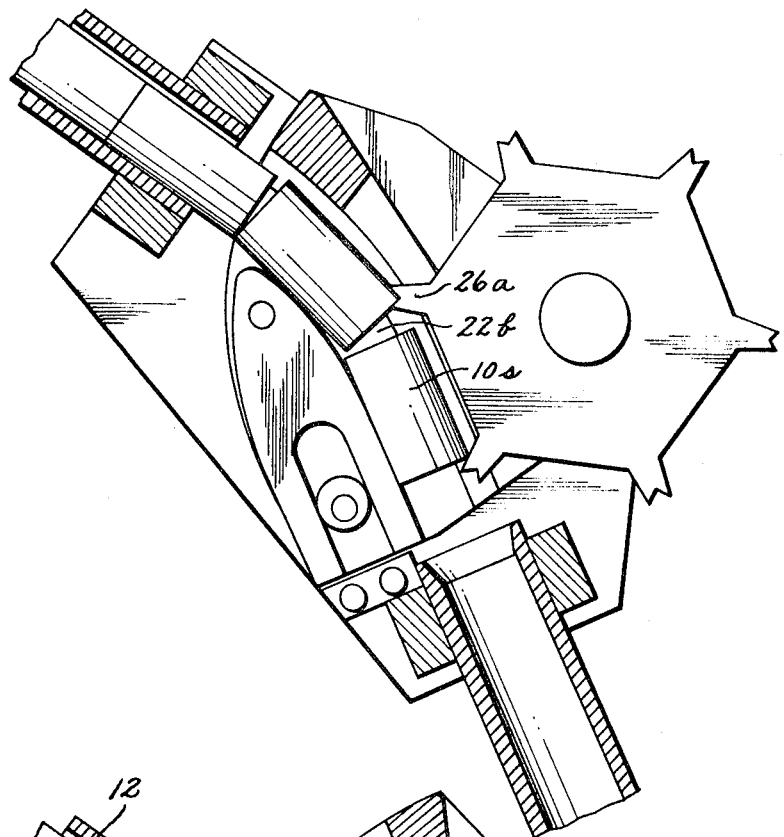
FIG. 3 is a side elevational view of the apparatus showing the star wheel jammed because of an improper short slug.

FIG. 3 shows the stoppage of a short slug 10s. From this FIGURE it can be seen that the short length of slug 10s causes the projection 26a to miss the non-uniformly positioned gap 22b and instead mesh with the following slug, which could be a proper slug, a long slug, or a short slug. In either case, the short slug 10s is trapped and cannot slide because the star wheel cannot turn.

Figure 4:
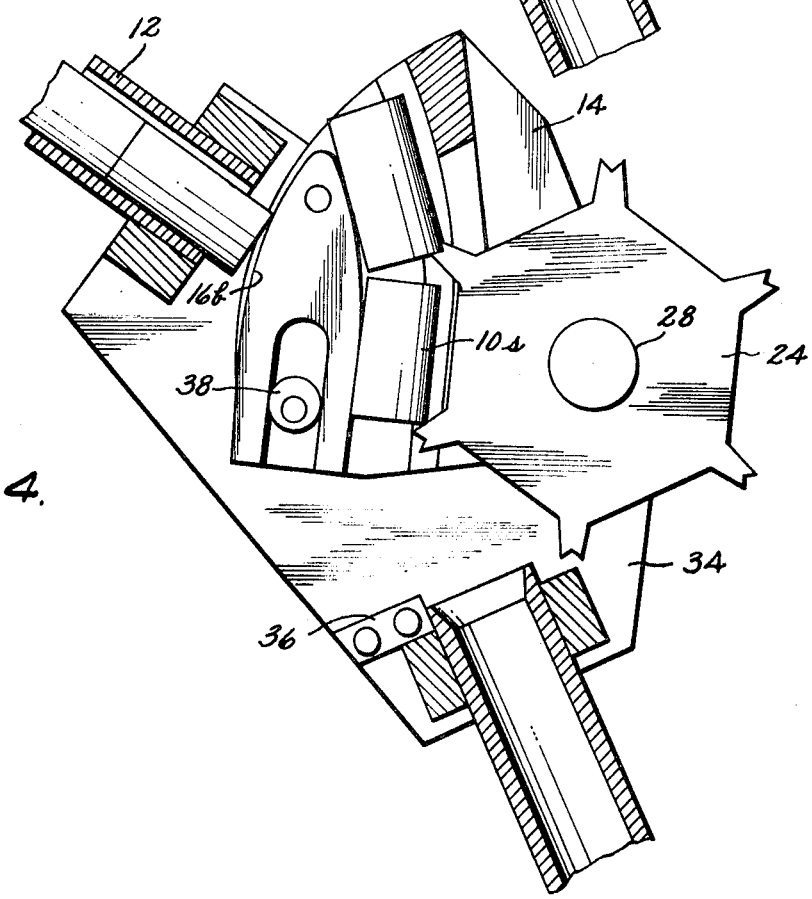
FIG. 4 is a side elevational view of the apparatus showing the sorting device pivoted to an inoperative position to permit manual removal of an improper long slug.

Since the sorting mechanism is jammed in either case when the slug is too long or too short, means must be provided to remove the faulty slug. The present invention provides for this by pivotably mounting the plate member 14 on the same center 28 as the star wheel 24 so that the entire sorting mechanism can be pivoted to an inoperative position as shown in FIG. 4. In the position shown in FIG. 4, a lower curved surface 16b on lower guide block 16 is in contact with the lowermost slug 10 in the feed pipe 12 to prevent the slugs in the feed pipe from dropping out by gravity. Actually, plate member can be pivoted all the way around until it contacts frame 34. At this position, however, curved surface 16b will not be in position to keep the slugs from falling out of the feed pipe. The improper length slugs 10s or 10l can be removed manually from the channel means when pivoted to the inoperative position.

The pivoted plate member 14 is supported in operative position on stop means 36 which may be any form of means on the frame to limit pivoting of the plate member by gravity in a counter-clockwise manner around center 28.

It will be appreciated that it may be desirable to make minor adjustments to the lower guide block 16 in order to accurately position the curved guide surface 16a. This is accomplished in the present invention by an eccentric adjustment 38 and a pivot 40 at the nose of block 16. This eccentric adjustment and pivot means also allows the device to be readjusted to fit changed standard lengths of slugs.

In addition to the stoppage of long slugs in the manner explained above, there is also another stoppage procedure which may occur with long slugs. Because of the inner curved guide surface 16a and outer curved retaining surface 18a, when a long slug attempts passage, it may hang up due to jamming in the channel means before the long slug reaches the star wheel. This procedure is a function of the radii of the two curved surfaces in the channel, the distance between the curved surfaces, the diameter of the slug, and the length of the slug.

What is claimed is:

1. An apparatus for sorting out improper length articles from a mass of articles comprising means to feed said mass of articles in an end-to-end manner, channel means positioned beneath said feed means to receive said end-to-end articles, said channel means having a convex inner curved surface on which said articles are slidably moved and guided, means rotatably mounted adjacent said curved surface and co-operating therewith to engage said articles so as to permit proper length articles to pass between the rotating means and the channel means while retaining improper length articles.

2. An apparatus as recited in claim 1 wherein said channel means comprises an outer retaining surface which is curved similar to the convex inner surface of said channel, said outer retaining surface having an opening therein through which said rotating means projects to engage said articles.

3. An apparatus as recited in claim 2 wherein as said articles slide on said convex inner surface of said channel means a gap means develops between the upper ends of successive articles, said rotating means comprising a free turning star wheel having a plurality of accurately spaced, outwardly extending projections which enter said gap means smoothly when the articles are within tolerances but which are prevented from entering the gap means smoothly when an article is outside of the predetermined tolerances, i. e. either too long or too short, the result being that the correct length articles fall through the channel means turning the star wheel by their own weight while the improper length articles are trapped and cannot turn the star wheel.

4. An apparatus as recited in claim 3 wherein said channel means is defined by an upper block means, the lower surface of which constitutes the outermost retaining guide of the channel means, and a lower block means, the upper surface of which constitutes the convex innermost guide surface of said channel means, said upper and lower block means being mounted on a plate member which is pivotally mounted to move from an operative position where the channel means is directly in line with the feed means to an inoperative position where the channel means is out-of-line with the feed means, said inoperative position being useful in clearing the channel when an improper length article stops operation of said apparatus.

5. An apparatus as recited in claim 4 wherein said lower block is mounted on said plate member by an eccentric adjustment which permits adjustment of said convex innermost guide surface relative to said star wheel as well as the outermost retaining surface.

6. An apparatus as recited in claim 5 wherein said plate member is pivoted on the same axis as said star wheel.

7. An apparatus for sorting out improper lengths of slugs comprising a gravity feed means through which slugs of varying lengths are fed end-to-end, a curved channel means positioned beneath said gravity feed means to receive said slugs in the same end-to-end manner, said curved channel means having an innermost guide surface of predetermined radius and an outermost retaining surface, said slugs when moving through said curved channel means being slidably supported on said guide surface so that while the lower forward end of each slug is in contact with the lower rear end of the preceding slug, the upper forward end of each slug is separated from the upper rear end of the preceding slug by a gap, a slot means in the outermost retaining surface, a star wheel having a plurality of spaced projections extending outwardly from the periphery of the star wheel, said star wheel being mounted adjacent said curved channel so that the spaced projections move through the slot means in the outermost retaining surface to mesh into the gaps between the upper ends of the slugs, the radius of the curved channel means and the distance between the spaced star wheel projections co-acting to permit the star wheel to turn when a proper length slug is positioned between two consecutive spaced projections but refusing to permit the star wheel to turn when a shorter slug or a longer slug is encountered.

8. An apparatus as recited in claim 7 wherein said curved channel means is located on a pivotally mounted plate member wherein said plate member and said channel means can be moved from an operative position in which the channel means is in line with said feed means to an inoperative position in which the channel means is out-of-line with said feed means, thus permitting easy removal of improper length articles from the channel means.

9. An apparatus as recited in claim 8 in which said channel means comprises an upper retaining block on which said outermost retaining surface is formed and a lower guide block on which said innermost guide surface is formed, and adjustment means on said lower guide block to permit adjustment of said guide block to match the required article length.

* * * * *